United States Patent
Baccouche et al.

(10) Patent No.: US 9,944,322 B2
(45) Date of Patent: Apr. 17, 2018

(54) COMPOSITE SUBFRAME DETACHMENT

(71) Applicant: Ford Global Technologies, LLC, Dearborn, MI (US)

(72) Inventors: Mohamed Ridha Baccouche, Ann Arbor, MI (US); Saied Nusier, Canton, MI (US); David Anthony Wagner, Northville, MI (US); Matthew John Zaluzec, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 14 days.

(21) Appl. No.: 14/847,218

(22) Filed: Sep. 8, 2015

(65) Prior Publication Data

US 2017/0066478 A1    Mar. 9, 2017

(51) Int. Cl.
*B62D 21/15* (2006.01)
*B62D 25/20* (2006.01)

(52) U.S. Cl.
CPC ........... *B62D 21/15* (2013.01); *B62D 21/155* (2013.01); *B62D 25/2072* (2013.01)

(58) Field of Classification Search
CPC ........................... B62D 21/15; B62D 25/2072
USPC ............ 296/187.08, 193.07, 205, 203.02, 29
See application file for complete search history.

(56) References Cited

U.S. PATENT DOCUMENTS

| | | | | |
|---|---|---|---|---|
| 3,697,108 A | * | 10/1972 | Diener | B60R 19/36 188/371 |
| 5,605,353 A | * | 2/1997 | Moss | B62D 21/09 188/376 |
| 6,367,869 B1 | * | 4/2002 | Baccouche | B62D 21/155 280/784 |
| 6,843,524 B2 | | 1/2005 | Kitagawa | |
| 8,246,105 B2 | * | 8/2012 | Mildner | B60K 11/04 180/274 |
| 8,500,191 B1 | * | 8/2013 | Baccouche | B62D 21/155 296/187.08 |
| 8,672,384 B2 | | 3/2014 | Fuchs et al. | |
| 8,985,630 B2 | * | 3/2015 | Sangha | B62D 27/065 280/124.109 |
| 2010/0032542 A1 | * | 2/2010 | Heitkamp | B60K 17/24 248/548 |
| 2014/0203543 A1 | * | 7/2014 | Onishi | B62D 21/155 280/784 |
| 2015/0061272 A1 | | 3/2015 | Watanabe et al. | |

FOREIGN PATENT DOCUMENTS

| | | |
|---|---|---|
| DE | 10057566 A1 | 5/2002 |
| DE | 10200600275 | * 12/2009 |
| DE | 102006002750 B4 | 12/2009 |
| KR | 20140004384 A | 1/2014 |

\* cited by examiner

*Primary Examiner* — D Glenn Dayoan
*Assistant Examiner* — E Turner Hicks
(74) *Attorney, Agent, or Firm* — Jason Rogers; Brooks Kushman P.C.

(57) ABSTRACT

A subframe for a vehicle includes a subframe structure and a rear end joint. The rear end joint is formed on the subframe structure for attachment to a floor via a bolt. The rear end joint defines a notch, having a collar surrounding the bolt. The rear end joint is configured such that, upon impact, the rear end joint interacts with the bolt to break the collar, split the notch, and detach the subframe structure from the floor.

17 Claims, 3 Drawing Sheets

US 9,944,322 B2

COMPOSITE SUBFRAME DETACHMENT

TECHNICAL FIELD

The present disclosure relates to a vehicle subframe detachment mechanism.

BACKGROUND

Attachments between vehicle subframes and floors require rigidity. A rigid attachment between the subframe and floor typically requires attachment at 4 to 6 points. A bolt may be used to extend through the subframe and floor to rigidly secure these components. In the event of an impact, the floor and subframe interact to sheer the bolt. Shearing the bolt provides detachment between the floor and the subframe to prevent damage to the floor. However, shearing the bolt requires a lot of force and may vary between vehicles based on the size of the vehicle. The floor and subframe may also account for loads applied to the vehicle by providing partial detachment between the subframe and the floor using slot configurations to prevent deformation to the bolt, the floor, or the subframe.

SUMMARY

A vehicle underbody structure includes a metal floor and a subframe. The subframe includes a composite end joint secured to the floor via a bolt. The end joint defines a collar and a tapered notch configured to slidably receive the bolt in response to relative movement between the subframe and floor to split the notch and fracture the collar from the subframe.

A vehicle includes a floor and a subframe. The subframe attaches to the floor at a plurality of attachment points via fasteners and a plurality of end joints. The plurality of end joints each define a notch configured to split on one of the fasteners in response to impact loads being applied to the subframe that cause relative movement between the subframe and floor.

A subframe for a vehicle includes a subframe structure and a rear end joint. The rear end joint is formed on the subframe structure for attachment to a floor via a bolt. The rear end joint defines a notch, having a collar surrounding the bolt. The rear end joint is configured such that, upon impact, the rear end joint interacts with the bolt to break the collar, split the notch, and detach the subframe structure from the floor.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
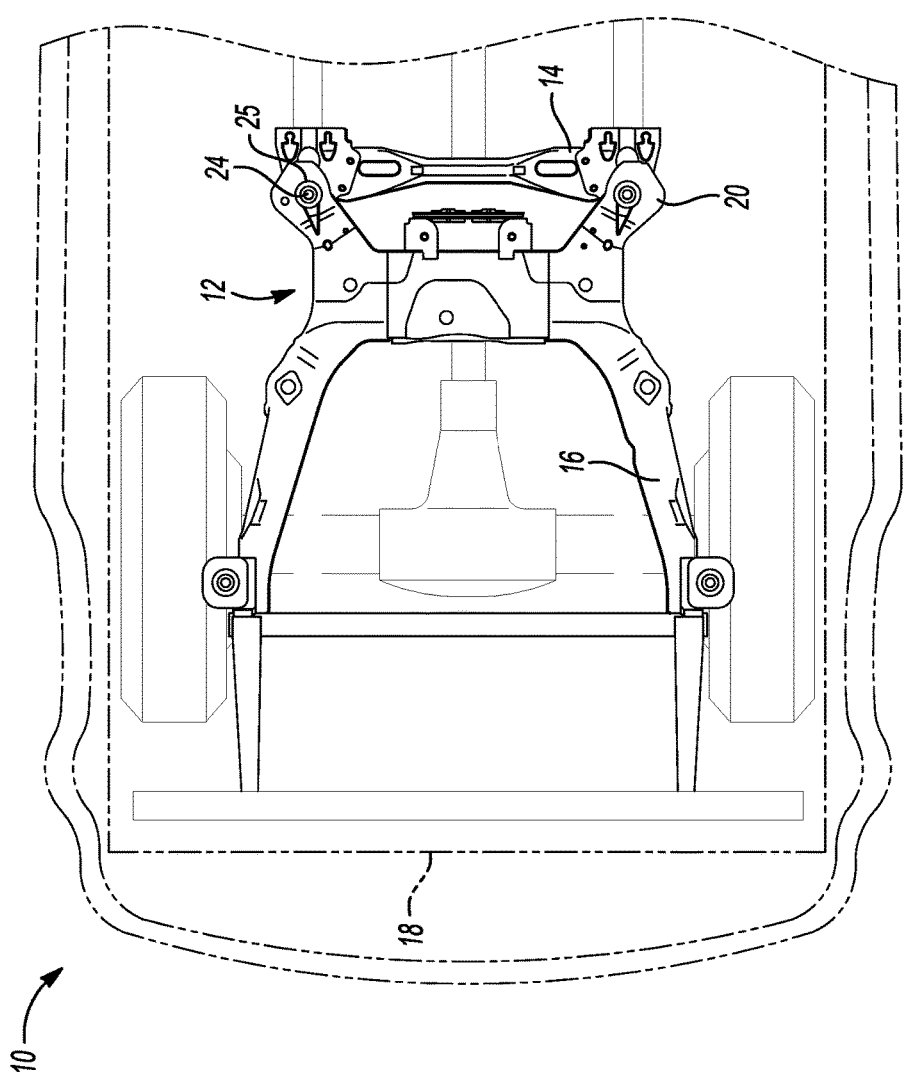
FIG. 1 is plan view of an underbody structure of a vehicle.

Referring to FIG. 1, a plan view of a vehicle 10 having an underbody structure 12 is shown. The underbody structure 12 includes a frame 14, a subframe 16, and a floor 18. The subframe 16 uses a rear end joint 20 to attach to the floor 18. The floor 18 attaches to the subframe 16 using a fastener 24. In at least one embodiment, the fastener 24 may be a bolt, screw, or shaft that allows for rigid attachment between the floor 18 and the subframe 16. A bushing 25 may also be used around the fastener 24 to reduce noise, vibration, and harshness transferred to the subframe 16 and the floor 18 during normal vehicle travel.

The rigid attachment between the subframe 16 and the floor 18 is required to ensure durability of the vehicle 10. However, in the event of an impact with the vehicle 10, the rigid attachment of the underbody structure 12 may cause toeboard intrusion through the floor 18. Complete detachment of the subframe 16 from the floor 18 in the event of an impact may further aid to reduce toeboard intrusion into the floor 18 of the vehicle 10. Maintaining rigidity during normal vehicle operation between the subframe 16 and the floor 18 of the underbody structure 12, as well as providing for complete separation between the subframe 16 and the floor 18 may be advantageous. The rear end joint 20 of the subframe 16 may be made of composite material, such as carbon fiber. Using a composite rear end joint 20 with the traditional metal subframe 16 may maintain the rigidity necessary during normal vehicle operation while providing complete detachment of the subframe 16 from the floor 18 in the event of an impact. The rear end joint 20 may be designed such that upon impact, the rear end joint 20 will break and separate the subframe 16 from the floor 18, preventing intrusion from the subframe 16 into the floor 18.

Figure 2:
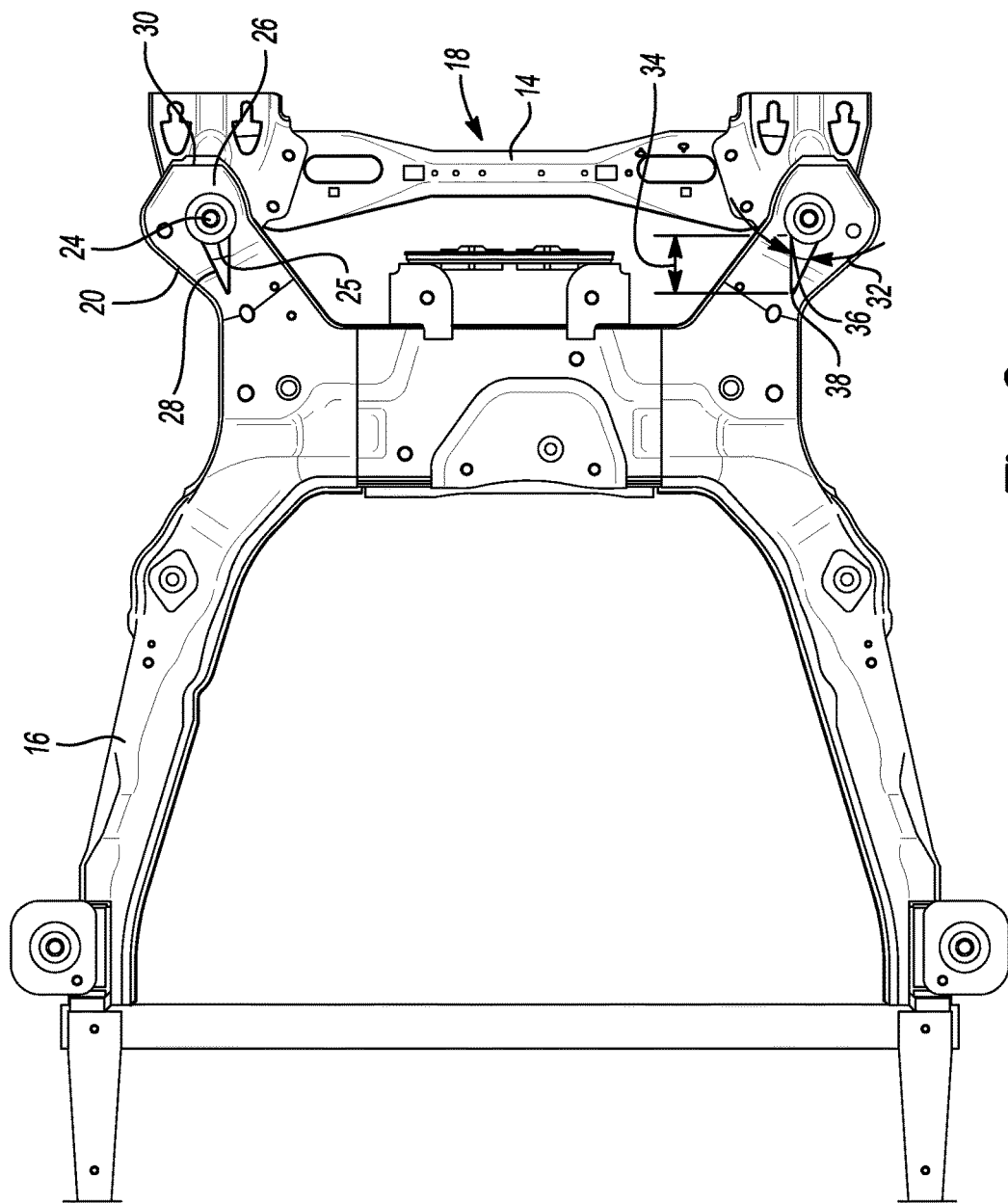
FIG. 2 is a top view of a rear attachment between a floor and a subframe for a vehicle.

FIG. 2 depicts attachment of the subframe 16 and the floor 18. Specifically, the rear end joint 20 of the subframe 16 attaches to the floor 18 using fasteners 24. As stated above, the fasteners 24 may further include bushings 25. The rear end joint 20 of the subframe 16 may include a collar 26 that surrounds the fastener 24 and the bushing 25. Likewise, the rear end joint 20 of the subframe 16 may also define a notch 28. The notch 28 may be formed adjacent to the collar 26. As will be described in more detail below, the collar 26 may be configured to allow further support between the subframe 16 and the floor 18, and the notch 28 may be configured to receive the fastener 24 upon impact with the subframe 16.

The collar 26 surrounds the fastener 24 and bushing 25. The collar 26 closes around the fastener 24 and the bushing 25 to increase support for the subframe 16. Adding the collar 26 increases the amount of material used to secure the subframe 16 to the floor 18. Adding material to the subframe 16 increases the durability of the subframe 16 during normal vehicle travel. For example, forming the rear end joint 20 from a composite material, such as carbon fiber, requires the collar 26 to provide added durability to the subframe 16 to maintain integrity of the subframe 16 during normal vehicle operation. The collar 26 may be substantially arcuate and formed defining an angled end 30. The end 30 may be angled with respect to the floor 18. For example, the floor 18 may be formed at an angle and the end 30 may be substantially parallel to the floor 18.

Toeboard intrusion results when the subframe 16 impacts the floor 18 and deforms the floor 18. With the collar 26 having an angle at the end 30 substantially parallel to the floor 18, toeboard intrusion may be substantially reduced by forcing the end 30 of the collar 26 to slide underneath the floor 18 in the event of an impact. Slanting the end 30 of the collar 26 substantially reduces the impact between the subframe 16 and the floor 18 and substantially eliminates deformation of the floor 18 due to impact with the subframe 16. The collar 26, therefore, allows the subframe 16 to provide a brittle end joint 20 while maintaining durability and integrity of the subframe 16 during normal vehicle operation. The collar 26 aids in effectuating complete detachment between the subframe 16 and the floor 18 during the impact event.

The notch 28 may be formed substantially adjacent to the collar 26 and defined on the end joint 20. The notch 28 may be formed having a substantially tapered configuration. In the substantially tapered configuration of the notch 28, the width 32 of the notch 28 gradually decreases from a first end 36 of the notch 28 to a second end 38 of the notch 28 along the length 34 of the notch 28 away from the collar 26. The length 34 of the notch 28 may be substantially equal to the length of the rear end joint 20. In at least one other embodiment, the notch 28 may also define a substantially rectangular configuration. A width 32 of the notch 28 is less than a width of the fastener 24. In the rectangular configuration of the notch 28, the width 32 may be uniform along the length 34 of the notch 28. As will be discussed with reference to the other Figures, the notch 28 acts as a detachment mechanism for completely detaching the subframe 16 from the floor 18 upon impact.

The notch 28 may be configured to direct energy absorbed by the subframe 16 in the event of an impact. For example when the subframe 16 is impacted, the subframe 16 may slide relative to the floor 18. The notch 28 may be designed such that, in the event of an impact, the notch 28 slidably receives the fastener 24. Slidably receiving the fastener 24 allows the notch 28 to direct the energy absorbed by the subframe 16 when the subframe 16 is impacted. Directing the energy absorbed by an impact further reduces energy transferred to the floor 18. The notch 28 allows the subframe 16 to completely detach from the floor 18 in a controlled and predictable manner without damaging the floor 18. Further, the notch 28 may be configured to provide for a controlled detachment of the subframe 16 from the floor 18 while maintaining the rigidity and stiffness required at the end joint 20 during normal vehicle travel.

Figure 3:
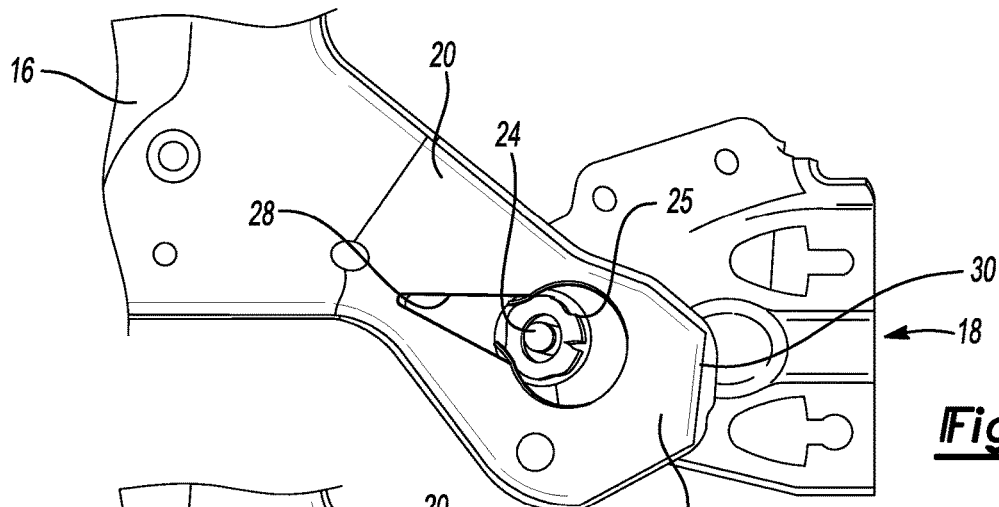
FIGS. 3 through 5 are perspective views of subframe feet moving at the attachment point between the subframe and the floor.
Figure 4:
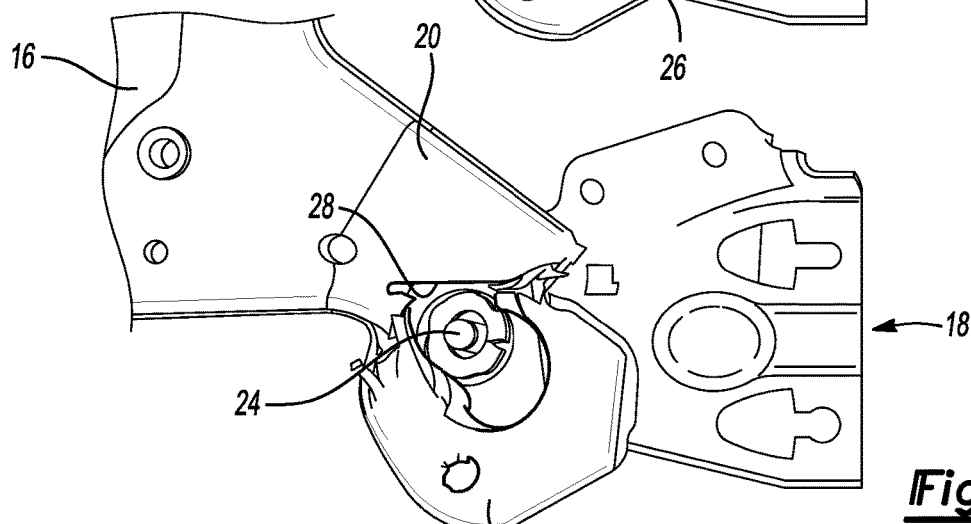
Figure 5:
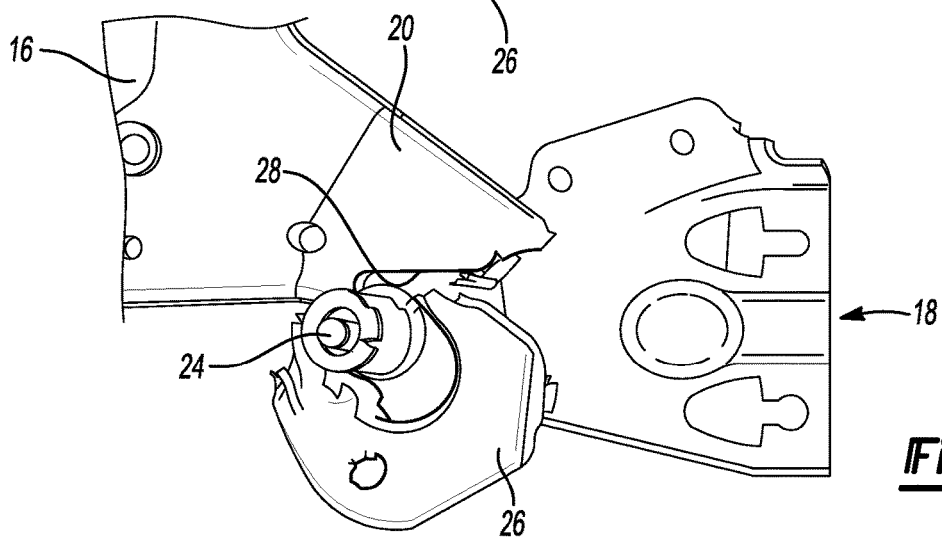

FIGS. 3 through 5 depict an impact with the subframe 16 and the detachment between the subframe 16 and the floor 18 using the collar 26 and the notch 28. FIG. 3 depicts the subframe 16, the fastener 24, the collar 26, and the notch 28 immediately after an impact with the subframe 16. FIG. 4 depicts the subframe 16, the fastener 24, the collar 26, and the notch 28 when the energy from the impact is being transferred and loaded onto the subframe 16. FIG. 5 depicts complete detachment of the subframe 16 through deformation of the end joint 20 as the end joint 20 absorbs the energy from the impact. Deformation of the end joint 20 allows for a robust and repeatable detachment mechanism between the subframe 16 and the floor 18 that takes advantage of a brittle composite end joint 20.

As depicted in FIG. 3, upon initial loading of the subframe 16, the subframe 16 moves such that the notch 28 is directed toward fastener 24 and the collar 26 begins to deform. As the subframe 16 is loaded, the end 30 of the collar 26 moves toward the floor 18. As stated above, toeboard intrusion may be reduced as the end 30 of the collar 26 is configured to slide underneath the floor 18. When the subframe 16 is loaded and the rear end joint 20 moves toward the floor 18, the bushing 25 is strained to failure. The end joint 20 begins to make contact with the fastener 24 when the bushing 25 is strained a failure. As stated above, the rear end joint 20 may be formed of a composite material, such as carbon fiber. The fastener 24 may be a rigid material, such as metal, or steel. Contact between the fastener 24 and the end joint 20 causes the end joint to deform. More specifically, the fastener 24 fractures the collar 26 and splits the notch 28 to absorb the energy from the impact with the subframe 16.

FIG. 4 depicts continual loading of the subframe 16 and deformation of the end joint 20 due to contact with the fastener 24. As the subframe 16 continues to move and the rear end joint 20 engages the fastener 24, the collar 26 plastically deforms and breaks. The collar 26 is configured to completely detach from the rear end joint 20 due to the brittleness of the composite subframe 16. For example, after the initial loading of the subframe 16 and the fastener 24 is directed toward the notch 28, the collar 26 cracks and begins to fracture from the end joint 20. Fracturing the collar 26 absorbs energy from the impact and begins to separate the subframe 16 from the floor 18. The collar 26 may be designed such that the fracture is controlled. For example, the design of the collar 26 allows the fracture to absorb energy and begin to direct the fastener 24 into the notch 28.

The collar 26 may act as a guide to direct the fastener 24 and the notch 28, and aids in providing complete separation of the subframe 16 from the floor 18. The collar 26 adds material to the rear end joint 20 to provide added support to the rear end joint 20 and provide repeatable and predictable fracture areas. For example, the amount of added material of the collar 26 may be optimized based on the amount of support needed by the end joint 20 and the direction of the notch 28. This allows control and repeatable complete detachment between the subframe 16 and the floor 18.

FIG. 5 depicts complete detachment of the subframe 16 from the floor 18 after the rear end joint 20 has absorbed the impact energy. After breaking the collar 26, the fastener 24 is directed into the notch 28. The fastener 24 will cause a splitting force through the notch 28 as the subframe 16 continues to be loaded. As stated above, the notch 28 follows a generally tapered configuration. The fastener 24 initially interacts with the notch 28 at the widest portion of the notch 28. Interaction between the notch 28 and the fastener 24 splits the notch 28 perpendicular to the fastener 24.

The splitting force caused by the interaction between the fastener 24 and the notch 28 further aids to dissipate energy from an impact event. Therefore, as the subframe 16 is loaded and the fastener 24 continues to interact with the notch 28, more energy is dissipated due to the tapered configuration of the notch 28. As the taper of the notch 28 gradually narrows the notch 28, the fastener 24 imparts more splitting force through the notch 28 on the rear end joint 20. The more splitting force required to split the notch 28, the more energy the rear end joint 20 absorbs. The dimensions of the notch 28 may be optimized to further dissipate energy from an impact. The dimensions of the notch 28 allow the rear end joint 20 to absorb energy from impacts of various magnitudes. The increase in splitting force, due to the tapered configuration of the notch 28, causes a combined tension and bending loading on the notch 28, and allows for complete detachment of the subframe 16. Completely detaching the subframe 16 from the floor 18 prevents energy from the impact from being transferred through the subframe 16 to the floor 18.

While exemplary to embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle underbody structure comprising:
   a metal floor; and
   a subframe including a composite end joint secured to the floor via a bolt, wherein the end joint defines a collar and a tapered notch configured to slidably receive the bolt in response to relative movement between the subframe and floor to split the notch and fracture the collar from the subframe, wherein the tapered notch extends completely through the end joint.

2. The underbody structure of claim 1, wherein the notch has a width less than a width of the bolt.

3. The underbody structure of claim 1, wherein the notch defines a length substantially equal to a length of the end joint.

4. The underbody structure of claim 1, wherein the composite end joint is a carbon fiber end joint.

5. The underbody structure of claim 1 further comprising a bushing mounted within the collar and configured to, upon impact, deform to permit interaction between the end joint and the bolt.

6. The underbody structure of claim 1, wherein the collar is configured to slide underneath and relative to the metal floor in response to the relative movement between the subframe and floor.

7. A vehicle comprising:
   a floor; and
   a subframe attached to the floor at a plurality of attachment points via fasteners and a plurality of end joints each defining a notch extending through a thickness of the end joint being configured to split on one of the fasteners in response to impact loads being applied to the subframe that cause relative movement between the subframe and floor.

8. The vehicle of claim 7 further comprising a collar formed on each of the end joints and configured to break on one of the fastener in response to the impact loads being applied to the subframe.

9. The vehicle of claim 8, wherein each of the collars is configured to slide underneath and relative to the floor in response to the relative movement between the subframe and floor.

10. The vehicle of claim 7, wherein the end joints are composite end joints.

11. The vehicle of claim 10, wherein the composite end joints are carbon fiber.

12. The vehicle of claim 7, wherein the notch has a width less than a width of each of the fastener.

13. A subframe for a vehicle comprising:
   a subframe structure; and
   a rear end joint formed on the subframe structure for attachment to a floor via a bolt, defining a notch extending through a thickness of the end joint, having a collar surrounding the bolt, and configured such that, upon impact, the rear end joint interacts with the bolt to break the collar, split the notch, and detach the subframe structure from the floor.

14. The subframe of claim 13 further comprising a bushing mounted within the collar and configured to, upon impact, deform to permit interaction between the rear end joint and the bolt.

15. The subframe of claim 13, wherein the rear end joint is a composite rear end joint.

16. The subframe of claim 15, wherein the composite rear end joint is carbon fiber.

17. The subframe of claim 15, wherein the notch has a width less than a width of the bolt.

* * * * *